United States Patent
Pilgrim et al.

(10) Patent No.: US 9,150,083 B2
(45) Date of Patent: Oct. 6, 2015

(54) SYSTEMS AND METHODS TO AUTOMATICALLY REDUCE AN AMOUNT OF LIGHT INTERACTING WITH A VEHICLE DISPLAY

(71) Applicants: Michael Andrew Pilgrim, Dublin, OH (US); Brent Nathaniel Gaertner, Columbus, OH (US); Wesley Wonchul Kim, Dublin, OH (US)

(72) Inventors: Michael Andrew Pilgrim, Dublin, OH (US); Brent Nathaniel Gaertner, Columbus, OH (US); Wesley Wonchul Kim, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 245 days.

(21) Appl. No.: 14/012,801

(22) Filed: Aug. 28, 2013

(65) Prior Publication Data

US 2015/0060649 A1    Mar. 5, 2015

(51) Int. Cl.
| | |
|---|---|
| *B60J 3/04* | (2006.01) |
| *G01J 1/42* | (2006.01) |
| *G02F 1/163* | (2006.01) |
| *G02F 1/133* | (2006.01) |
| *B60J 3/02* | (2006.01) |
| *B60J 1/20* | (2006.01) |

(52) U.S. Cl.
CPC .. *B60J 3/04* (2013.01); *B60J 1/208* (2013.01); *B60J 3/0204* (2013.01); *G01J 1/4204* (2013.01); *G02F 1/13318* (2013.01); *G02F 1/163* (2013.01)

(58) Field of Classification Search
CPC .............. B60J 3/02; B60J 3/0204; B60J 3/04
USPC ........ 250/214 AL, 205, 221, 222.1; 296/97.1, 296/97.2, 97.4, 146.1, 146.2; 359/275, 601, 359/609
See application file for complete search history.

(56) References Cited

U.S. PATENT DOCUMENTS

| | | |
|---|---|---|
| 5,158,334 A | 10/1992 | Felland |
| 5,873,621 A | 2/1999 | Kuighadush et al. |
| 6,293,607 B1 | 9/2001 | Sasanuma |
| 6,666,493 B1 | 12/2003 | Naik |
| 6,811,201 B2 | 11/2004 | Naik |
| 8,120,716 B2 | 2/2012 | Vitito |
| 8,146,980 B2 | 4/2012 | Takeuchi et al. |
| 8,162,376 B1 | 4/2012 | Grossmith |
| 8,960,761 B2 * | 2/2015 | Newman ...................... 296/97.2 |
| 2003/0151272 A1 | 8/2003 | Sugimoto et al. |
| 2009/0116098 A1 | 5/2009 | Chang |

FOREIGN PATENT DOCUMENTS

| | | |
|---|---|---|
| DE | 3724270 A1 | 2/1989 |
| DE | 10203243 A1 | 7/2003 |

(Continued)

*Primary Examiner* — Kevin Pyo
(74) *Attorney, Agent, or Firm* — Armstrong Teasdale LLP

(57) ABSTRACT

A method for controlling an intensity of light entering a vehicle is provided. The method includes determining an operational status of a display device in the path of the light entering the vehicle, and receiving, by a computing device, an intensity of light present in the vehicle using at least one light sensor. The method also includes comparing the intensity of light with a predefined intensity threshold, and activating a light damping mechanism when the measured light intensity exceeds the predefined intensity threshold and when the operational status of the display device is active, wherein the light damping mechanism facilitates at least one of reducing the intensity of light interacting with the display device and reducing light from the display device reflecting off a window.

20 Claims, 5 Drawing Sheets

(56) References Cited

FOREIGN PATENT DOCUMENTS

| | | | |
|---|---|---|---|
| FR | 2823154 A1 | 10/2002 | |
| GB | 2214474 A | 9/1989 | |
| GB | 2263678 A | 8/1993 | |
| JP | 6313816 A | 1/1988 | |
| JP | 2004136843 A | 5/2004 | |
| JP | 2005007920 A | 1/2005 | |
| JP | 2008222045 A | 9/2008 | |

* cited by examiner

SYSTEMS AND METHODS TO AUTOMATICALLY REDUCE AN AMOUNT OF LIGHT INTERACTING WITH A VEHICLE DISPLAY

BACKGROUND

The field of the disclosure relates generally to vehicle sun screen/shade systems and more particularly, to systems that selectively control the intensity and amount of light entering a vehicle.

Entertainment displays have been used in vehicles for many years. In at least some known systems the displays are positioned in the rear of the vehicle to enable viewing by passengers in the rear seats. Other known systems allow viewing by a passenger seated in the passenger seat and/or by the driver. Such displays enable viewers to enjoy video entertainment, such as a movie or video game, and/or view information such as the environment to the rear of the vehicle while the vehicle is driving rearwardly. The entertainment display may reduce boredom during long drives for young or difficult passengers, or provide needed information to a driver, such as a local road map.

Known systems typically include transparent materials, such as glass. However, depending on the amount, direction, and/or intensity, light entering the vehicle may irradiate the display. Moreover, light irradiating the display may have an adverse effect on the viewing of the images displayed, such as by creating glare and/or reducing contrast. Currently, known systems may allow users to manually adjust the brightness level of the display to improve viewing conditions. However, even increasing the brightness level of known displays may be insufficient to overcome the adverse effect of the light. Increases in the brightness level of the display reduce the image quality of the video as compared to videos displayed during normal viewing.

Furthermore, in known systems, light from the display may cause adverse reflections on the inside surface of vehicle windows that can result in double images. More specifically, adverse reflections typically occur at night during low light conditions when the light from the display interacts with the glass of the window and is reflected to the eye-point of a viewer.

BRIEF DESCRIPTION

In one aspect, a method for controlling an intensity of light entering a vehicle is provided. The method includes determining an operational status of a display device in the path of the light entering the vehicle, and receiving, by a computing device, an intensity of light present in the vehicle using at least one light sensor. The method also includes comparing the intensity of light with a predefined intensity threshold, and activating a light damping mechanism when the measured light intensity exceeds the predefined intensity threshold and when the operational status of the display device is active, wherein the light damping mechanism facilitates at least one of reducing the intensity of light interacting with the display device and reducing light from the display device reflecting off a window.

In another aspect, a system for controlling an amount of light entering a vehicle is provided. The system includes a display device, at least one light sensor, a light damping mechanism, and a computing device communicatively coupled to said at least one light sensor and said light damping mechanism. The computing device configured to receive a signal indicative of an intensity of light entering the vehicle from said at least one light sensor, and compare the intensity of light entering the vehicle with a predefined intensity threshold. The computing device further configured to activate said light damping mechanism when the intensity of light entering the vehicle exceeds the predefined intensity threshold and when an operational status of said display device is active, wherein said light damping mechanism facilitates at least one of reducing the intensity of light interacting with said display device and reducing light from said display device reflecting off a window.

In yet another aspect, one or more computer readable storage media having computer executable instructions embodied thereon is provided. When executed by at least one processor, the computer-executable instructions cause the processor to receive a signal indicative of an intensity of light entering the vehicle using at least one light sensor, and compare the intensity of light entering the vehicle with a predefined intensity threshold. The computer-executable instructions also cause the processor to activate a light damping mechanism when the intensity of light exceeds the predefined intensity threshold and when an operational status of a display device is active, wherein the light damping mechanism facilitates at least one of reducing the intensity of light interacting with the display device and reducing light from the display device reflecting off a window.

The features, functions, and advantages described herein may be achieved independently in various embodiments of the present disclosure or may be combined in yet other embodiments, further details of which may be seen with reference to the following description and drawings.

DETAILED DESCRIPTION OF THE DISCLOSURE

Figure 1:
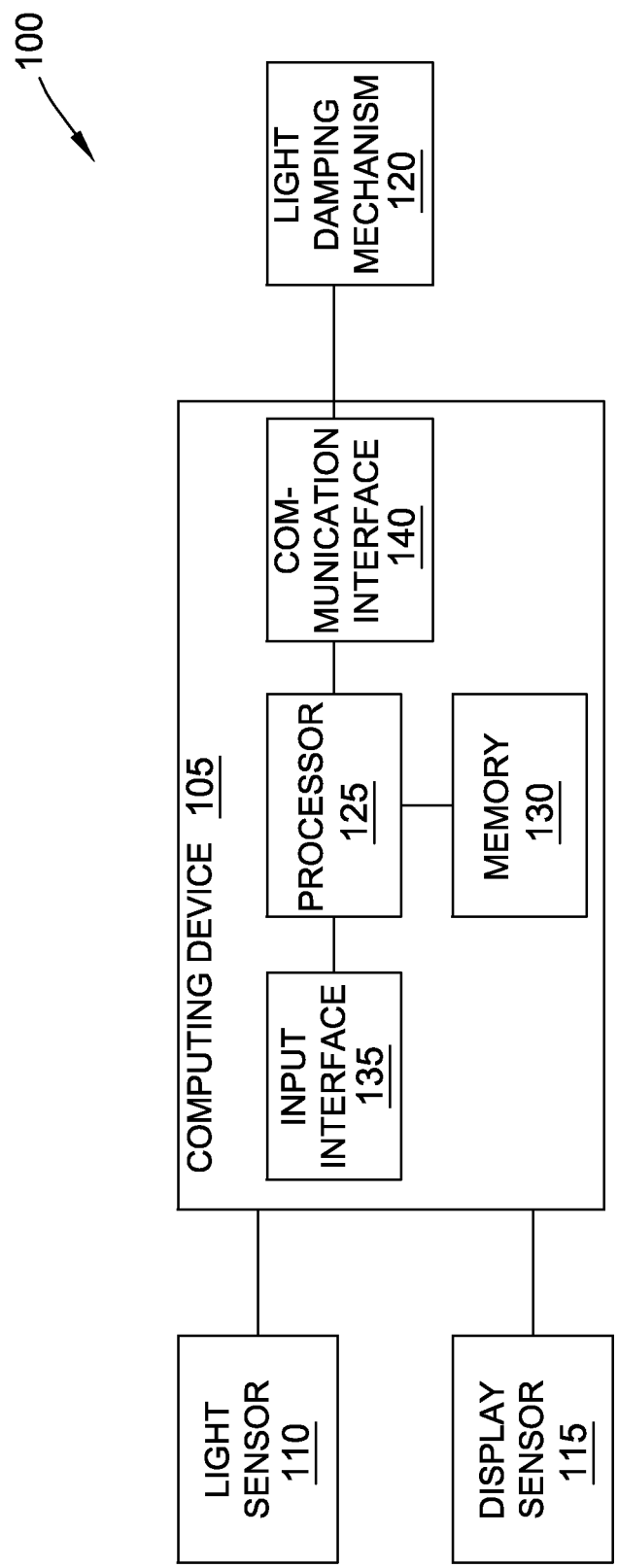
FIG. 1 is a schematic illustration of an exemplary light control system that may be used with a vehicle.

The embodiments described herein provide control systems that may be used to improve viewing of a display in a vehicle. More specifically, the control system described herein includes a computing device coupled to a memory to facilitate at least one of reducing an intensity of light interacting with a display and reducing reflected images formed by light from the display on a window of the vehicle. The control system may further be based on the operating status of the display. For example, the computing device may determine the operating status of the display as active or inactive. The computing device may also measure the light intensity interacting with the display using at least one light sensor, and compare the measured light intensity with a predefined intensity threshold. The computing device activates a light damping mechanism when the measured light intensity exceeds the predefined intensity threshold. When activated, the light damping mechanism facilitates reducing the intensity of light interacting with the display and/or facilitates reducing light from the display interacting with a window of the vehicle.

As used herein, the term "light damping mechanism" includes any selectively controllable apparatus that is capable of facilitating controlling an intensity of light entering a vehicle and/or reflecting from a window within the vehicle. For example the light damping mechanism may include a sunshade, an electro-chromic filter, and/or any other apparatus that enables the light damping mechanism to function as described herein.

As used herein, the term "display" includes any device capable of presenting information to at least one viewer, such as a cathode ray tube (CRT), a liquid crystal display (LCD), an organic LED (OLED) display, and/or an "electronic ink" display. The display may present images for entertainment, such as movies, video games, television shows, photographs, etc. The display may also present images for informational purposes, such as images of an area behind the vehicle, maps, etc. The display may be double sided so as to allow a driver and/or front passenger to view an end oriented toward the forward compartment, and a rear passenger to view an end oriented toward the rear compartment. Although illustrated as positioned behind the driver, the display may be located anywhere in the vehicle.

As used herein, an element or step recited in the singular and preceded with the word "a" or "an" should be understood as not excluding plural elements or steps, unless such exclusion is explicitly recited. Furthermore, references to one "implementation" or one "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

FIG. 1 is a schematic illustration of an exemplary light control system 100 including a computing device 105, a light sensor 110, a display sensor 115, and a light damping mechanism 120. In the exemplary embodiment, computing device 105 includes at least one processor 125 that is coupled to memory device 130 for executing instructions. In some implementations, executable instructions are stored in memory device 130. In the exemplary embodiment, computing device 105 performs one or more operations described herein by executing the executable instructions stored in memory device 130. For example, processor 125 may be programmed by encoding an operation as one or more executable instructions in memory device 130 and by providing the executable instructions from memory device 130 to processor 125 for execution.

Processor 125 may include one or more processing units (e.g., in a multi-core configuration). Further, processor 125 may be implemented using one or more heterogeneous processor systems in which a main processor is present with secondary processors on a single chip. In another illustrative example, processor 125 may be a symmetric multi-processor system containing multiple processors of the same type. Further, processor 125 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 130 is one or more devices that enable information, such as executable instructions and/or other data, to be stored and retrieved. Memory device 130 may include one or more computer readable media, such as, without limitation, dynamic random access memory (DRAM), static random access memory (SRAM), a solid state disk, and/or a hard disk. Memory device 130 may be configured to store, without limitation, application source code, application object code, configuration data, predefined intensity threshold settings, predefined disabling threshold settings, and/or any other type of data.

In the exemplary embodiment, computing device 105 includes an input interface 135 that is coupled to processor 125. Input interface 135 is configured to receive input from at least one light sensor 110 and display sensor 115. Input interface 135 may include, for example, an antenna, a wireless data port, a wired data port, or any other device capable of receiving data such that the methods and systems function as described herein.

Computing device 105, in the exemplary embodiment, includes a communication interface 140 coupled to processor 125. Communication interface 140 communicates with one or more devices, such as light damping mechanism 120. To communicate with remote devices, communication interface 140 may include, for example, a wired network adapter, a wireless network adapter, an antenna, and/or a mobile telecommunications adapter.

In the exemplary embodiment, light sensor 110 senses an intensity and/or direction of light irradiating the sensor, and transmits a signal indicating the measured light intensity to computing device 105. Light sensor 110 may be any device capable of sensing an intensity of light, including, but not limited to, a photocell, photodiode, CCD array, CMOS array, photo-resistor, and optical detector. In one implementation light sensor 110 is coupled to and/or located within display 210 (shown in FIG. 2). In other implementations light sensor 110 is located anywhere within the vehicle such that light sensor 110 functions as described herein. In some implementations, light sensor 110 may be a plurality of light sensors 110 located in different positions within the vehicle.

Display sensor 115 may be any device configured to determine an operations status of display 210 and to transmit information regarding the operational status to computing device 105. In some implementations, display sensor 115 may be a plurality of display sensors 115.

In the exemplary embodiment, light control system 100 also includes at least one light damping mechanism 120 communicatively coupled to computing device 105. Light damping mechanism 120 facilitates reducing an intensity of incoming light interacting with display 210 when enabled, and allows incoming light to interact with display 210 uninhibited when disabled. Also, in the exemplary embodiment, light damping mechanism 120 may further facilitate reducing reflections on the surfaces of windows when enabled.

In operation, computing device 105 receives a measured light intensity from the at least one light sensor 110 and an operational status of display 210 from display sensor 115. Computing device 105 processes the measured light intensity from light sensor 110 and compares the measured light intensity with at least one predefined intensity threshold stored in memory device 130. Computing device 105 transmits a signal enabling light damping mechanism 120 when the measured light intensity exceeds the predefined intensity threshold, and when the operational status of display 210 is active. Light damping mechanism 120 facilitates reducing an amount of light interacting with display 210 when enabled, thus improving the viewing quality of an image presented on display 210.

As used herein, exceeding an intensity threshold mean being more intense than a high intensity threshold, less intense than a low intensity threshold, and/or varying to a greater extent than a varying intensity threshold. Computing device 105 may receive other signals used in enabling and/or disabling the display, e.g., without limitation, an occupant sensor (not shown). More specifically, computing device 105 may determine whether passengers are present, and activate light damping mechanism based in part on a signal from the occupant sensor.

Figure 2:
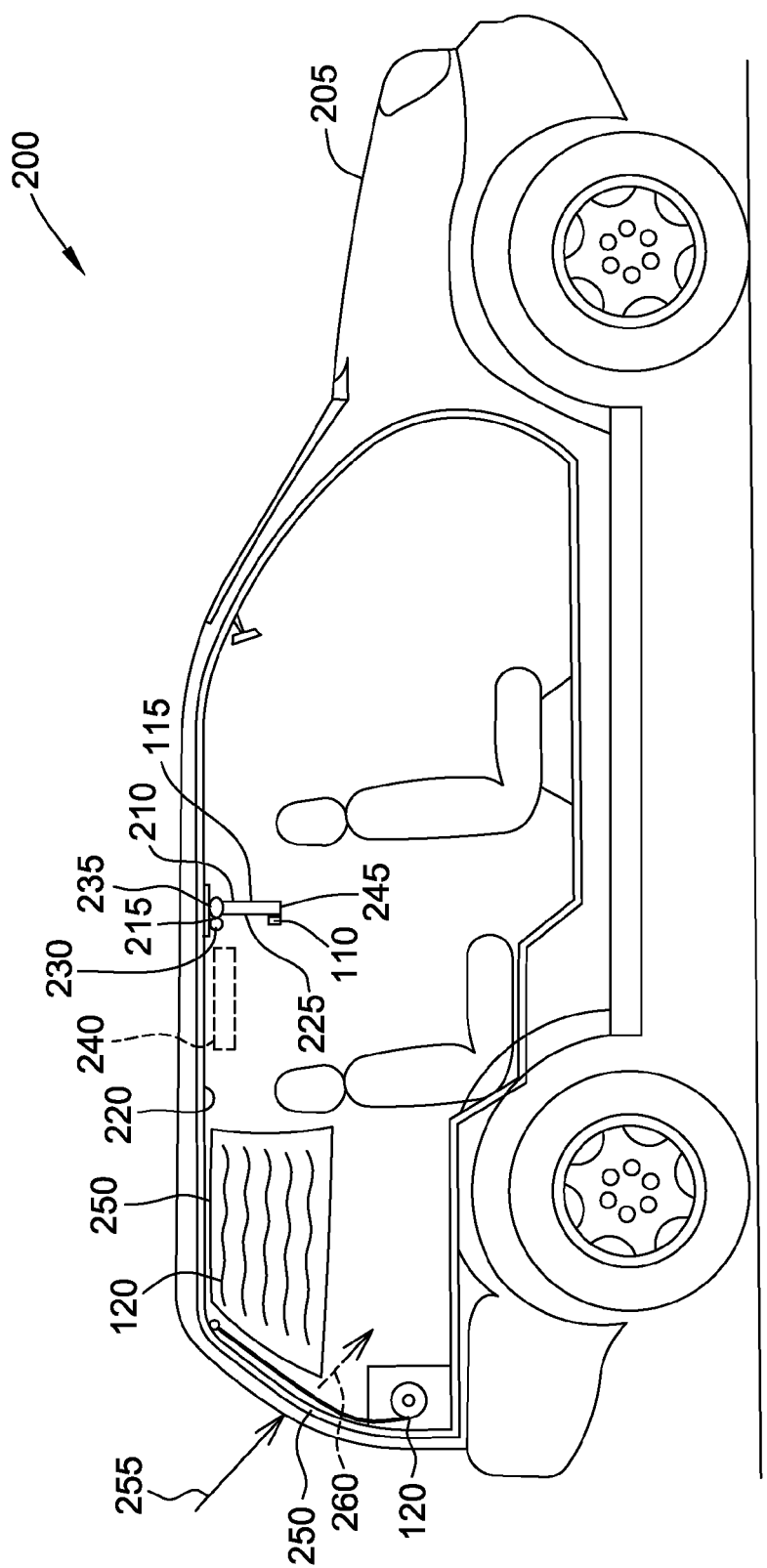
FIG. 2 is a cross-sectional view of an exemplary vehicle utilizing the exemplary light control system shown in FIG. 1.

FIG. 2 illustrates a cross-sectional view 200 of an exemplary vehicle 205 that includes light control system 100 (shown in FIG. 1).

In the exemplary embodiment, a display 210 coupled to a mount 215 is mounted to a roof 220 of vehicle 205. In other implementations, display 210 may be mounted to a rear portion of a seat, a headrest, or any other part of vehicle 205 that enables the systems and methods described herein to function as described herein. Vehicle 205 may be any type of vehicle, including but not limited to, an automobile, truck, car, van, airplane, or boat. Display 210 may be any device capable of displaying an image on a screen 225, such as a cathode ray tube (CRT), a liquid crystal display (LCD), an organic LED (OLED) display, and/or an "electronic ink" display.

In the exemplary embodiment, display 210 is also coupled to a display motor 230. Display motor 230 selectively translates display 210 about a pivoting hinge 235 from a stowed position 240 to an operating position 245, and vice-versa. In other implementations, display 210 may be manually translated about hinge 235 from operating position 245 to stowed position 240, and vice-versa. Also in the exemplary embodiment, display 210 is determined to be in operating position 245 when display 210 is substantially perpendicular to roof 220 of vehicle 205 such that a viewer may view an image on display 210. Display 210 is in a stowed position 240 when display 210 is substantially parallel to vehicle roof 220.

Display sensor 115 (shown in FIG. 1) may be coupled to display 210, and, in the exemplary embodiment, determines the current position of display 210. For example, display sensor 115 may determine display 210 is in operating position 245 and may then transmit an active signal to computing device 105. In other implementations, display sensor 115 may determine display 210 in stowed position 240, and may then transmit an inactive signal to computing device 105. In other implementations, display sensor 115 transmits an active signal to computing device 105 when display 210 is actively presenting an image on screen 225, and transmits an inactive signal to computing device 105 when display 210 is not presenting an image on screen 225. Furthermore, in some embodiments, display sensor 115 transmits an active signal to computing device 105 when display 210 receives a video signal from a video source (not shown in FIG. 2).

In the exemplary embodiment, vehicle 205 also includes at least one light damping mechanism 120 coupled to at least one window 250. Window 250 may be a rear window, side window, windshield, sunroof, or any other transparent surface through which light enters vehicle 205. In the exemplary embodiment, light damping mechanism 120 facilitates reducing the intensity of incoming light 255 by at least one of absorbing, scattering, reflecting, fluorescing, deflecting, shielding, and/or interfering with incoming light 255 such that a transmitted light 260 that may interact with display 210 has a reduced intensity as compared to incoming light 255. Also in the exemplary embodiment, light damping mechanism 120 facilitates reducing reflections on window 250 by at least one of absorbing, scattering, deflecting, shielding and/or interfering with the light generated by display 210 and traveling toward window 250 such that light reflected to an eye point of an occupant may be reduced.

Figure 3:
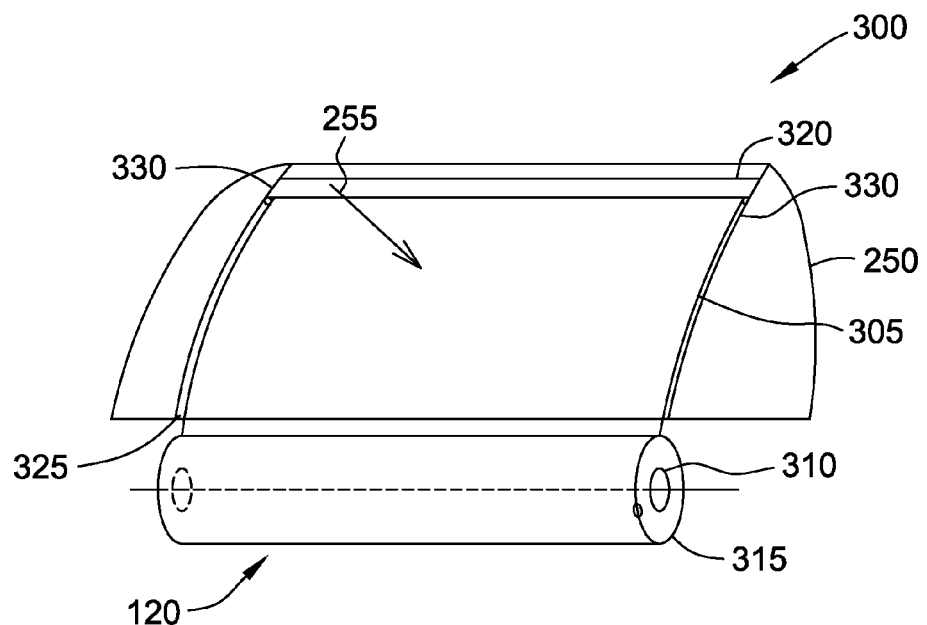
FIG. 3 is a perspective view of an exemplary sunshade that may be used with the light control system shown in FIG. 1.

FIG. 3 illustrates an exemplary embodiment of light damping mechanism 120 (shown in FIG. 1) including a sunshade system 300. In the exemplary embodiment, sunshade system 300 includes a sunshade 305 coupled and/or proximate to window 250 (shown in FIG. 2), sunshade motor 310, and an optional sunshade housing 315. Sunshade 305 may be made of any material capable of absorbing, reflecting, scattering, fluorescing, shielding, deflecting, interfering, otherwise facilitates reducing an intensity of incoming light 255, and/or facilitates reducing light from display 210 reflecting off window 250 and/or sunshade 305. In the example embodiment, sunshade 305 is coupled to sunshade motor 310, and sunshade motor 310 extends sunshade 305 into an extended position 320, and retracts sunshade 305 into a retracted position 325. In the exemplary embodiment, when sunshade 305 is in extended position 320, sunshade 305 facilitates reducing an intensity of incoming light 255 interacting with display 210, and facilitates reducing an intensity of light generated by display 210 and reflecting off window 250 and/or sunshade 305. When sunshade 305 is in the retracted position 325, sunshade allows incoming light 255 to be transmitted into vehicle 205 uninhibited. In some implementations, sunshade 305 and sunshade motor 310 may be positioned within a sunshade housing 315. Also, in at least some implementations, sunshade motor 310 extends sunshade 305 into extended position 320 along at least one track 330 coupled to window 250.

Figure 4:
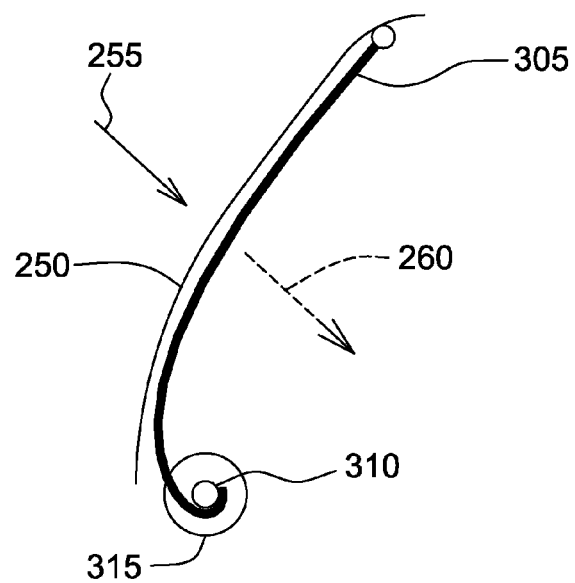
FIG. 4 is a cross sectional view of the exemplary sunshade shown in FIG. 3.

FIG. 4 illustrates a cross-sectional view of the exemplary light damping mechanism 120 shown in FIG. 3.

In the exemplary embodiment, sunshade system 300 includes sunshade 305 proximate to window 250, sunshade motor 310, and sunshade housing 315. Sunshade 305 facilitates reducing an intensity of incoming light 255 entering vehicle 205 (shown in FIG. 2) as transmitted light 260, such that transmitted light 260 that may interact with display 210 (shown in FIG. 2) has a reduced intensity as compared to incoming light 255. Sunshade 305 further facilitates reducing light from display 210 from reflecting off window 250.

Figure 5:
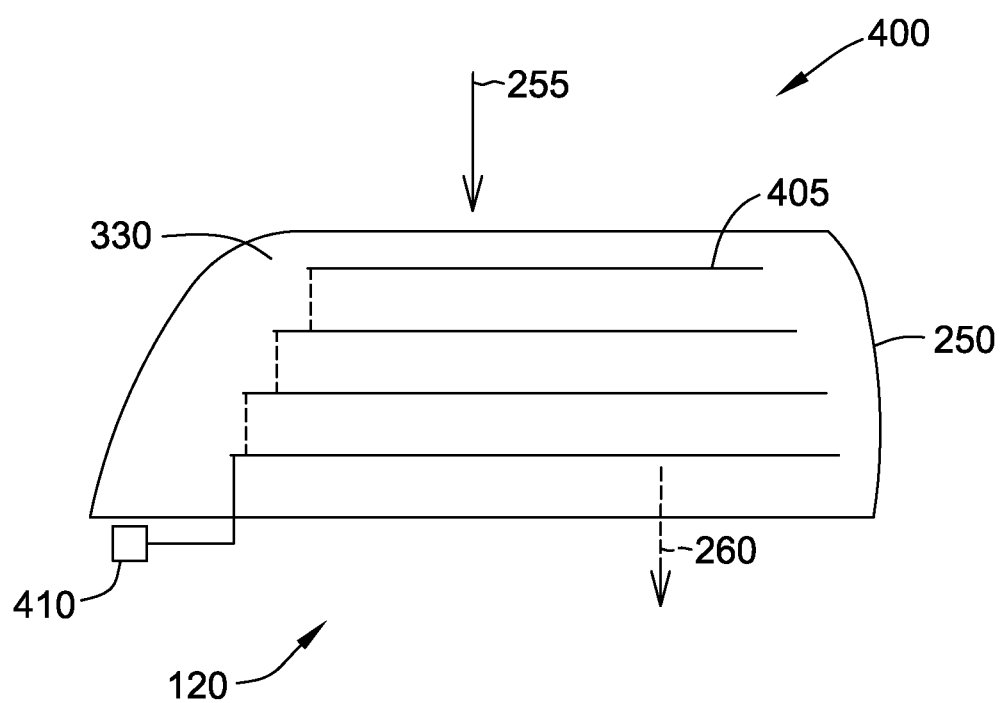
FIG. 5 is a perspective view of an exemplary electro-chromic filter that may be used with the light control system shown in FIG. 1.

FIG. 5 illustrates an alternative embodiment of light damping mechanism 120 (shown in FIG. 1) including an electro-chromic filter system 400. In the alternative embodiment, electro-chromic filter system 400 includes at least one electro-chromic filter 405 coupled to at least one window 250 and an electric power source 410. Electro-chromic filter 405 may be at least one of a plurality of liquid crystal devices, a plurality of suspended particles within window 250, and an electro-chromic film. When electro-chromic filter 405 receives an applied voltage from electric power source 410, the opacity of window 250 is altered, which, in turn, controls an intensity of incoming light 255 passing through window 250 into vehicle 205 as transmitted light 260. In the example embodiment, electric power source 410 is communicatively coupled to computing device 105 (shown in FIG. 1), and computing device 105 controls the voltage applied to electro-chromic filter 405 to vary the opacity of window 250 to one of a plurality of preset opacity levels. Each of the plurality of preset opacity levels facilitates reducing the intensity of incoming light 255 passing through window 250 by a different amount. Electro-chromic filter 405 further facilitates reducing light from display 210 (shown in FIG. 2) from reflecting off window 250 based on the opacity level set by computing device 105.

Figure 6:
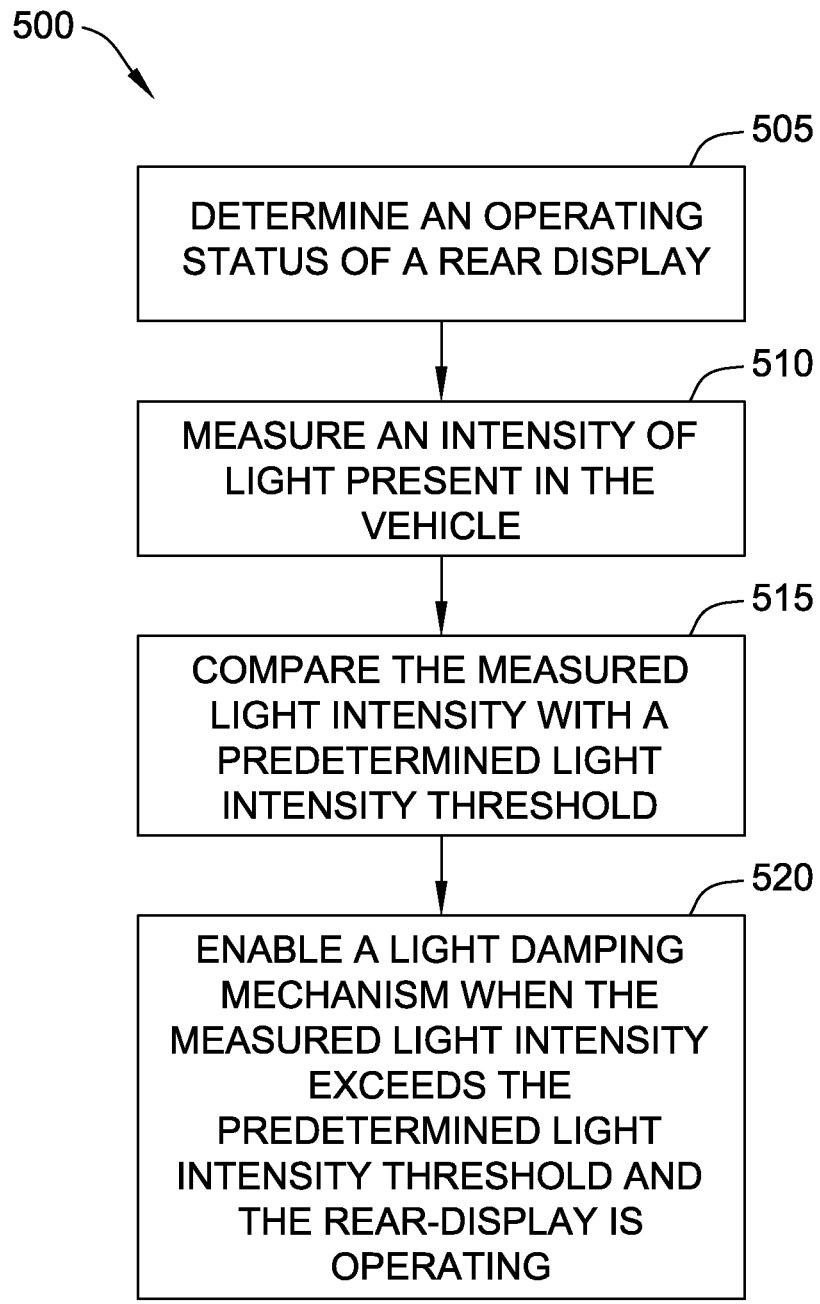
FIG. 6 is an exemplary block diagram of the light control system shown in FIG. 1.

FIG. 6 is a flowchart of an exemplary method implemented by computing device 105 (shown in FIG. 1) to control an intensity of light entering a vehicle. During operation, computing device 105 determines 505 an operational status of display 210 (shown in FIG. 2) based on at least one of the position of display 210 and whether display 210 is actively presenting an image based on a signal transmitted by display sensor 115.

Further in the exemplary embodiment, computing device 105 determines 510 an intensity of light interacting with display 210 using at least one light sensor 110. Computing device 105 compares 515 the measured light intensity with a predefined intensity threshold stored in memory 130 and determines whether the measured light intensity exceeds the predefined intensity threshold. In the exemplary embodiment, the predefined intensity threshold indicates an intensity of light that may adversely affect the viewing quality of display 210. More specifically, in one implementation, the predefined intensity threshold may be a high intensity threshold, and exceeding the high intensity threshold is indicative of an intensity of light that may cause a lowered contrast. In another implementation, the predefined intensity threshold may be a low intensity threshold, and exceeding the low intensity threshold is indicative of an intensity of light that may support adverse reflections on window 250 (shown in FIG. 2). In still other implementations, the predefined intensity threshold may be an intensity variation threshold, and exceeding the intensity variation threshold is indicative of an intensity of light that has changed by more than a predefined amount within a predefined period of time, possibly caused by streaks of light passing over the screen. In some implementations, the predefined intensity threshold may be based on the direction of light measured by light sensor 110. Alternatively, the predefined intensity threshold indicates any other level that enables the methods and systems to function as described herein. Moreover, in the example embodiment, the predefined intensity thresholds may be set by the user.

Also in the exemplary embodiment, computing device 105 activates 520 at least one light damping mechanism 120 (shown in FIG. 1) when the measured light intensity exceeds the predefined intensity threshold, and display 210 is operating. More specifically, in one implementation, computing device 105 extends sunshade 305 (shown in FIG. 3) to an extended position 320 using sunshade motor 310 to facilitate reducing the incoming light 255 transmitted through window 250 and/or facilitate preventing light from display 210 reflecting from window 250. In other implementations, computing device 105 causes electric power source 410 (shown in FIG. 5) to apply a voltage to electro-chromic filter 405 to facilitate reducing the incoming light 255 transmitted through window 250 and/or facilitate reducing light from display 210 reflecting off window 250.

In at least one embodiment, computing device 105 disables the at least one light damping mechanism 120 when display 210 becomes inactive. More specifically, in one implementation, computing device 105 may disable the at least one light damping mechanism 120 when display 210 is moved to a stowed position 240. In other implementations, computing device 105 may disable the at least one light damping mechanism 120 when display 210 is not presenting an image.

In at least one embodiment, computing device 105 measures a second light intensity using light sensor 110, compares the second light intensity measurement with a predefined disabling threshold stored in memory 130, and disables the at least one light damping mechanism 120 when the second measured light intensity exceeds the predefined disabling threshold. In one implementation, the predefined disabling threshold indicates an intensity of light able to maintain quality viewing of display 210. Alternatively, the predefined disabling threshold may be any intensity of light that enables the systems and methods to function as described herein.

The above-described light control system provides a reliable and automatic means for improving the viewing conditions of a vehicle display. More specifically, the light control system includes a light damping mechanism that is automatically activated when an intensity of light exceeds a predefined threshold, enabling a vehicle display to present a high-quality image. In some embodiments, a sunshade is extended and retracted by a sunshade motor to facilitate reducing light entering the vehicle, and thereby improve the contrast and viewing conditions of the display. In other embodiments, electro-chromic filters are coupled to the window and controlled to facilitate reducing the intensity of light entering the vehicle. Accordingly, the electro-chromic filters provide reduced glare and improved contrast compared to known systems. Furthermore, the electro-chromic filters may facilitate reducing the light entering the vehicle by varying degrees, enabling high quality viewing of the display while maintaining safe driving conditions.

The methods and systems described herein may be implemented using computer programming or engineering techniques including computer software, firmware, hardware or any combination or subset thereof, wherein the technical effects may be achieved by performing at least one of the following steps: (a) determining an operational status of a display device in the path of the light entering the vehicle; (b) receiving, by a computing device, an intensity of light present in the vehicle using at least one light sensor; (c) comparing the intensity of light with a predefined intensity threshold; and (d) activating a light damping mechanism when the measured light intensity exceeds the predefined intensity threshold and when the operational status of the display device is active, wherein the light damping mechanism facilitates at least one of reducing the intensity of light interacting with the display device and reducing light from the display device reflecting off a window.

Exemplary embodiments of a light control system 100 are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to describe the embodiments of the disclosure, including the best mode, and also to enable any person skilled in the art to practice the systems and methods described herein, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling an intensity of light entering a vehicle, said method comprising:

determining an operational status of a display device in the path of the light entering the vehicle;

receiving, by a computing device, an intensity of light present in the vehicle using at least one light sensor;

comparing the intensity of light with a predefined intensity threshold; and activating a light damping mechanism when the measured light intensity exceeds the predefined intensity threshold and when the operational status of the display device is active, wherein the light damping mechanism facilitates at least one of reducing the intensity of light interacting with the display device and reducing light from the display device reflecting off a window.

2. A method in accordance with claim 1, wherein activating a light damping mechanism includes extending at least one sunshade from a retracted position to an extended position when the measured light intensity exceeds the predefined intensity threshold and when the operational status of the display device is active.

3. A method in accordance with claim 1, wherein activating a light damping mechanism includes activating at least one electro-chromic filter associated with the window of the vehicle to alter the opacity of the window.

4. A method in accordance with claim 3, wherein said method further comprises controlling the at least one electro-chromic filter to alter the opacity of the window to one of a plurality of preset opacity levels, wherein each of the plurality of preset opacity levels facilitates reducing the intensity of light interacting with the display device by a different amount.

5. A method in accordance with claim 1, wherein determining an operational status of the display device includes determining that the display device is active when the display device is in an operating position, and determining that the display is inactive when the display device is in a stowed position.

6. A method in accordance with claim 1, wherein determining an operational status of the display device includes determining that the display device is active when the display device is displaying at least one image, and determining that the display device is inactive when the display device is not displaying an image.

7. A method in accordance with claim 1, wherein the method further comprises disabling the light damping mechanism based on a determination of at least one of the operational status of the display device being inactive and a second measured light intensity exceeding a predefined disabling threshold.

8. A system for controlling an amount of light entering a vehicle, said system comprising:
   a display device;
   at least one light sensor;
   a light damping mechanism; and
   a computing device communicatively coupled to said at least one light sensor and said light damping mechanism, said computing device configured to:
      receive a signal indicative of an intensity of light entering the vehicle from said at least one light sensor;
      compare the intensity of light entering the vehicle with a predefined intensity threshold; and
      activate said light damping mechanism when the intensity of light entering the vehicle exceeds the predefined intensity threshold and when an operational status of said display device is active, wherein said light damping mechanism facilitates at least one of reducing the intensity of light interacting with said display device and reducing light from said display device reflecting off a window.

9. A system in accordance with claim 8, wherein said computing device is configured to extend at least one sunshade from a retracted position to an extended position when said intensity of light exceeds the predefined intensity threshold and when the operational status of said display device is active.

10. A system in accordance with claim 8, wherein said light damping mechanism includes at least one electro-chromic filter associated with the window of the vehicle, wherein said at least one electro-chromic filter alters the opacity of the window.

11. A system in accordance with claim 10, wherein said computing device is further configured to control said at least one electro-chromic filter to alter the opacity of the window to one of a plurality of preset opacity levels, wherein each of the plurality of preset opacity levels facilitates reducing the intensity of light interacting with said display device by a different amount.

12. A system in accordance with claim 8, wherein said computing device is configured to determine that said display device is active when said display device is in an operating position, and determine that said display device is inactive when said display device is in a stowed position.

13. A system in accordance with claim 8, wherein said computing device is configured to determine that said display device is active when said display device is displaying at least one image, and determine that the display device is inactive when said display device is not displaying at least one image.

14. A system in accordance with claim 8, wherein said computing device is further configured to disable said light damping mechanism based on a determination that at least one of the operational status of the display device being inactive, and a second measured light intensity exceeding a predefined disabling threshold.

15. One or more non-transitory computer readable storage media having computer executable instructions embodied thereon, wherein, when executed by at least one processor, the computer-executable instructions cause the processor to:
   receive a signal indicative of an intensity of light entering the vehicle using at least one light sensor;
   compare the intensity of light entering the vehicle with a predefined intensity threshold; and
   activate a light damping mechanism when the intensity of light exceeds the predefined intensity threshold and when an operational status of a display device is active, wherein the light damping mechanism facilitates at least one of reducing the intensity of light interacting with the display device and reducing light from the display device reflecting off a window.

16. A computer readable media in accordance with claim 15, wherein the computer-executable instructions cause the processor to extend at least one sunshade from a retracted position to an extended position.

17. A computer readable media in accordance with claim 15, wherein the light damping mechanism includes at least one electro-chromic filter coupled to the window of the vehicle, wherein the at least one electro-chromic filter selectively alters the opacity of the window.

18. A computer readable media in accordance with claim 17, wherein the computer-executable instructions cause the processor to control the at least one electro-chromic filter to alter the opacity of the window to one of a plurality of preset opacity levels, wherein each of the plurality of preset opacity levels facilitates reducing the intensity of light interacting with the display device by a different amount.

19. A computer readable media in accordance with claim 15, wherein the computer-executable instructions cause the processor to determine that the display device is active when the display device is in an operating position, and determine that the display device is inactive when the display device is in a stowed position.

20. A computer readable media in accordance with claim 15, wherein the computer-executable instructions cause the processor to determine that the display device is active when the display device is displaying at least one image, and determine that the display device is inactive when the display is not displaying an image.

\* \* \* \* \*